United States Patent [19]

Weaver

[11] Patent Number: 5,573,985
[45] Date of Patent: Nov. 12, 1996

[54] CERAMIC MATRIX COMPOSITES USING STRENGTHENING AGENTS OF SILICON BORIDES OF THE FORM SI-B-C

[75] Inventor: Samuel C. Weaver, Knox County, Tenn.

[73] Assignee: Millennium Materials, Inc., Knoxville, Tenn.

[21] Appl. No.: 531,552

[22] Filed: Sep. 18, 1995

[51] Int. Cl.$^6$ .......................... C04B 35/577; C04B 35/58
[52] U.S. Cl. ..................... 501/96; 501/87; 501/88; 501/89; 501/92; 501/103; 501/128
[58] Field of Search .................. 501/88, 92, 96, 501/103, 127, 128, 89, 87

[56] References Cited

U.S. PATENT DOCUMENTS

| | | | |
|---|---|---|---|
| 3,011,377 | 12/1961 | Schweickert et al. | 23/284 |
| 3,174,827 | 3/1965 | Wakelyn et al. | 23/208 |
| 3,230,053 | 1/1966 | Wakelyn et al. | 23/277 |
| 3,520,740 | 7/1970 | Addamiano | 148/175 |
| 4,370,390 | 1/1983 | Burk | 428/614 |
| 4,387,080 | 6/1983 | Hatta et al. | 423/345 |
| 4,461,842 | 7/1984 | Jamet | 501/95 |
| 4,543,345 | 9/1985 | Wei | 501/95 |
| 4,558,016 | 12/1985 | Bronson et al. | 501/95 |
| 4,585,500 | 4/1986 | Minjolle et al. | 156/89 |
| 5,130,278 | 7/1992 | Riccitiello et al. | 501/96 X |
| 5,143,540 | 9/1992 | Pyzik et al. | 501/92 X |
| 5,162,270 | 11/1992 | Ownby et al. | 501/95 |
| 5,180,533 | 1/1993 | Kamiya et al. | 501/96 X |

*Primary Examiner*—Karl Group
*Attorney, Agent, or Firm*—Pitts & Brittian, P.C.

[57] ABSTRACT

Strengthened and toughened ceramic composite bodies are achieved through the use of a silicon boride composition of silicon borides and borides of the form Si-B-C. This strengthening and hardening is achieved when the silicon boride composition is present over a wide range, although a preferred amount is about 20 wt. %. This strengthening and toughening occurs for oxides, carbides, nitrides, and mixtures thereof, for example. One silicon boride composition for this application is silicon hexaboride. Further enhancement is achieved by the addition of up to about 25 wt. % carbon in the silicon hexaboride. Accordingly, the preferred silicon boride composition is a Si-B-C composition, with carbon being added to $SiB_6$, for example.

16 Claims, No Drawings

CERAMIC MATRIX COMPOSITES USING STRENGTHENING AGENTS OF SILICON BORIDES OF THE FORM SI-B-C

TECHNICAL FIELD

The present invention relates generally to ceramic bodies and their formation, and more particularly to strengthened and toughened ceramic bodies wherein the strengthening and toughening agent is selected from silicon boride and variations of silicon borides of the form of Si-B-C. In particularly, the ceramic matrix composites utilize silicon hexaboride.

BACKGROUND ART

Oxide and carbide ceramics have many desirable properties which are most useful, and indeed required, for many modern industrial and technological uses and processes. These desirable properties include very high hardness, light weight, abrasion resistance, stability and retention of properties at high temperatures, chemical durability and inertness. Their brittleness characteristic, however, often limits their use when structural integrity in cyclic load and stress conditions exist or are required.

A world-wide market has developed for silicon carbide for a variety of structural, abrasive and electronic applications. Boron carbide, another commonly-used ceramic, is widely used in abrasion and wear applications. It is also a major component in nuclear applications because of its capability to capture neutrons. When used alone, these ceramics exhibit the undesirable characteristics described above; namely, the lack of strength and toughness.

In recent years there has been increasing interest in the manufacture of composite materials utilizing ceramic whiskers, fibers or platelets as the material used for reinforcing metallic, polymeric or ceramic matrix materials. This not only strengthens most metallic and polymeric matrix materials, but also provides an attractive toughening mechanism for ceramics.

Various composites have been described in the patent literature, some of which are U.S. Pat. No. 4,370,390 issued to R. Burk on Jan. 25, 1983; U.S. Pat. No. 4,461,842 issued to J. Jamet on Jul. 24, 1984; U.S. Pat. No. 4,543,345 issued to G. Wei on Sep. 24, 1985; U.S. Pat. No. 4,558,016 issued to S. Bronson et al on Dec. 10, 1985; U.S. Pat. No. 4,585,500 issued to L. Minjolle et al on Apr. 29, 1986; and U.S. Pat. No. 5,162,270 issued to P. Ownby et al on Nov. 10, 1992.

Other research on reinforced composites has been disclosed in U.S. Pat. No. 3,520,740 issued to A. Addamiano on Jul. 14, 1970; U.S. Pat. No. 3,011,877 issued to H. Schwieckert et al on Dec. 5, 1961; U.S. Pat. No. 4,387,080 issued to Hatta et al on Jun. 7, 1983; and U.S. Pat. Nos. 3,174,827 and 3,230,053 issued to N. Wakerlyn et al on Mar. 23, 1965, and Jan. 18, 1966, respectively. Recent work regarding the strengthening of metallic composites is described in co-pending U.S. patent application Ser. No. 08/467,188 filed May 6, 1995, with a common inventor and assignee to the present invention.

Many, if not most, of the materials used for strengthening of ceramics often add undesired weight to the ceramic composite. For example, the typical carbide-type strengthening agents when added to aluminum oxide in any significant amount can have an effect upon some of the uses of the ceramic body.

Accordingly, it is an object of the present invention to provide a strengthening and toughening agent for ceramic bodies that reduces the weight of the added reinforcement material.

Another object of the present invention is to provide a strengthening and toughening agent for ceramic bodies in the form of silicon hexaboride.

A further object of the present invention is to provide a strengthening and toughening agent for ceramic bodies in the form of Si-B-C.

These and other objects of the present invention will become apparent upon a consideration of a detailed description that follows.

SUMMARY OF THE INVENTION

In accordance with the present invention, silicon hexaboride and closely related compounds, some containing carbon, are used for the forming of ceramic composite bodies. Specifically, silicon hexaboride imparts additional strength and toughness to such ceramic bodies as boron carbide, aluminum oxide, zirconium oxide and silicon carbide. In addition, a small amount of carbon in the Si-B compound increases the melting temperatures of the strengthening and toughening agent.

BEST MODE FOR CARRYING OUT THE INVENTION

Silicon-boron compounds are very lightweight ceramic compositions. Accordingly, they provide a reduced weight of a composite ceramic body containing the same.

Various composite ceramic bodies were fabricated from structural ceramics and silicon hexaboride. For example, composites of silicon hexaboride ($SiB_6$) and boron carbide ($B_4C$) were fabricated by intimately mixing the respective powders and thereafter formed into bodies using conventional ceramic consolidation techniques. Typically the base ceramic powders were about 15 micrometers in size. The hexaboride particles had a size of about 0.1 to about 40 micrometers, and preferably, the size was about 20 micrometers. These composites were manufactured across the entire Si-B-C system.

Additional composites were prepared from silicon hexaboride and alumina ($Al_2O_3$). These composites contained from near zero $SiB_6$ to nearly 100% thereof. The powders of the base ceramic were about 1 micrometer in size, and the composites were fabricated using conventional techniques. The hexaboride powders were about the same size as described above.

EXAMPLE

Composites of aluminum oxide and Si-B-C were manufactured by blending $Al_2O_3$ powder of about 1 micrometer and 6 micrometer Si-B-C powder. The composite blend contained 1 part by weight Si-B-C to 10 parts by weight $Al_2O_3$. The Si-B-C was a mixture of $SiB_6$ and 10 wt. % carbon. The powder was dry ball-milled for purposes of mixing and blending. Oleic acid was added as a lubricant. The mix was then blended in acetone with camphor added as a binder. The mix was cold pressed on a dual-action press to pressures of about 60,000 psi. The parts were baked at 200° C. for four hours, and then fired to 1800° C. in a continuous pusher furnace in an argon atmosphere. The parts were at temperatures for about one hour.

Parts fabaricated under these conditions showed a tensile strength from diametral compressive tests of 150 mPa, and compressive test values of 820 mPa.

Composites of silicon hexaboride and zirconia ($ZrO_2$) have been produced that contained up to about 20 wt. % of the hexaboride. The particle sizes and forming techniques were the same as above.

Still other composites using silicon hexaboride were prepared by mixing the hexaboride powder with silicon carbide and silicon nitride in amounts across the entire systems. The sizes and forming techniques were essentially the same as above.

While, in most systems, a wide range of silicon hexaboride can be added to the basic ceramic material (e.g., from about 0.1 to 80 wt. %), a range of about 10 to about 40 wt. % is most practical for most applications. Within these ranges the resultant ceramic composite exhibit improved strength and toughness in contrast to the basic ceramic alone. Further, the resultant ceramic composite body had reduced weight as compared to those prepared with prior art strengthening agents.

It will be recognized by those versed in the art that, from these results, many ceramic bodies will benefit by silicon hexaboride addition. Accordingly, the present invention is applicable to all of the ceramics where increased strength is needed. This will include, for example, oxide, carbide and nitride ceramic materials.

The addition of carbon to the $SiB_6$ ceramic in the composite bodies has been investigated to form a Si-B-C composition. For example, increased melting temperatures of the agent are achieved by adding from about 0.1 to about 25 wt. % carbon. A $SiB_6$ ceramic in the composite normally exhibiting a melting temperature of about 1850°–1950° C. (without carbon) exhibits a melting temperature approaching 2300° C. with the addition of small amounts of carbon. For some applications of ceramic composite bodies this increased melting temperature is significantly important.

Certain other silicon-boride compositions have specific gravity values close to that of the silicon hexaboride. For example, silicon tetraboride ($SiB_4$) is expected to perform in a manner similar to that of the hexaboride because of its similar properties. Composites using the tetraboride will similarly be improved by the addition of small amounts of carbon (typically less than 25 wt. %).

From the foregoing, it will be understood by persons skilled in the art that improved ceramic matrix composites have been achieved by the addition of a silicon boride material. The compositions for the composites are easily prepared using conventional ceramic composite forming technology.

Although specific compositions and particulate sizes are discussed above, these are for the purpose of illustration and not for limiting the present invention. Rather, the invention is to be limited only by the appended claims and their equivalents.

I claim:

1. A strengthened and toughened ceramic composite formed from a mixture of a matrix ceramic powder selected from the group consisting of oxides, carbides, nitrides and combinations thereof, and a dispersed phase of particles of a silicon boride composition, said silicon boride composition containing about 0.1 to about 25 wt. % carbon, said mixture being consolidated into said composite.

2. The composite of claim 1 wherein said silicon boride composition is silicon hexaboride.

3. The composite of claim 2 wherein said silicon hexaboride has an average particle size of about 6 micrometers.

4. The composite of claim 1 wherein said ceramic powder is an oxide.

5. The composite of claim 4 wherein said oxide is selected from the group consisting of aluminum oxide ($Al_2O_3$), zirconium oxide ($ZrO_2$), and mixtures thereof.

6. The composite of claim 5 wherein said oxide is aluminum oxide ($Al_2O_3$).

7. The composite of claim 1 wherein said ceramic powder is a carbide.

8. The composite of claim 6 wherein said carbide is selected from the group consisting of boron carbide ($B_4C$), silicon carbide (SiC), and mixtures thereof.

9. The composite of claim 8 wherein said carbide is boron carbide ($B_4C$).

10. The composite of claim 1 wherein said particles of silicon boride composition have a particle size of about 0.1 to about 20 micrometers.

11. The composite of claim 1 wherein said particles of said silicon boride composition are present in a range of about 0.1 to about 80 wt. % in said composite.

12. A strengthened and toughened ceramic composite formed from a mixture of a matrix ceramic powder selected from the group consisting of oxides, carbides, nitrides, and combinations thereof, and a dispersed phase of particles of a Si-B-C composition containing about 0.1 to about 25 wt. % carbon, said mixture being consolidated into said composite.

13. The composite of claim 12 wherein said Si-B-C composition is silicon hexaboride to which is added carbon.

14. The composite of claim 12 wherein said particles of said Si-B-C composition are present in a range of about 0.1 to about 80 wt. % in said composite.

15. The composite of claim 13 wherein said ceramic powder particles are about 15 micrometer in size and said particles of said Si-B-C composition are about 6 micrometers in size.

16. A strengthened and toughened ceramic composite formed from a mixture of a matrix ceramic powder selected from the group consisting of oxides, carbides, nitrides and combinations thereof, and a dispersed phase of 0.1 to about 80 wt. % of particles of a Si-B-C composition, said ceramic powder being about 15 micrometer in size, said Si-B-C composition being $SiB_6$ containing about 0.1 to about 25 wt. % carbon and having a particle size of about 0.1 to about 20 micrometers, said mixture being consolidated into said composite.

\* \* \* \* \*